Nov. 22, 1932.    H. C. COLE    1,888,791

SPRAYING METHOD AND MACHINE

Filed Sept. 27, 1930

WITNESS:
Rob't R. Kitchel

INVENTOR
Harry C. Cole
BY
Augustus B. Stoughton
ATTORNEY.

Patented Nov. 22, 1932

1,888,791

UNITED STATES PATENT OFFICE

HARRY C. COLE, OF PHILADELPHIA, PENNSYLVANIA

SPRAYING METHOD AND MACHINE

Application filed September 27, 1930. Serial No. 484,850.

There are situations in the arts where liquids in the form of a number of sprays or jets supplied from a common source are directed upon moving or traveling sheets or webs, one example is a machine for spraying water onto glassine webs. In such situations the machine of the present invention is useful.

Objects of the present invention are to obtain better coverage such as is obtained by spacing the sprays in close proximity with each other. Another object of the invention is to equally divide and spray, through a plurality of jets or nozzles, which may be closely spaced, liquid coming under pressure through one throttle orifice. Another object of the invention is to provide that the pressure back of the throttle orifice and on the liquid may be widely varied whilst the object last indicated is accomplished. Another object of the invention is to provide that the supply of liquid may be interrupted and when renewed, the spray is resumed and the objects above indicated are accomplished. Another object of the invention is to provide smaller sprays than can be obtained by the employment of a single throttle hole or orifice for the liquid supplied to each spray.

Other objects of the invention will appear from the following description at the end of which the invention will be claimed.

However, generally stated, the invention may be said to comprise a spraying machine having means for equally dividing and spraying a supply of liquid under pressure, which means comprise a series of openings of substantially the same size providing a group of liquid jets, a corresponding series of openings arranged for providing air jets for spraying the liquid jets, the discharge openings of the liquid jets being arranged outside of the air columns of the air jets to oppose the flow of the liquid jets and create uniform back pressure thereon, and a single orifice through which liquid is fed under pressure to the group of liquid jets.

The invention also comprises the improvements to be presently described and finally claimed.

In the following description reference will be made to the accompanying drawing forming part hereof and in which Figure 1 is a front elevation of so much of a spraying device as is necessary for an explanation of the invention with parts removed.

Figures 2, 3:
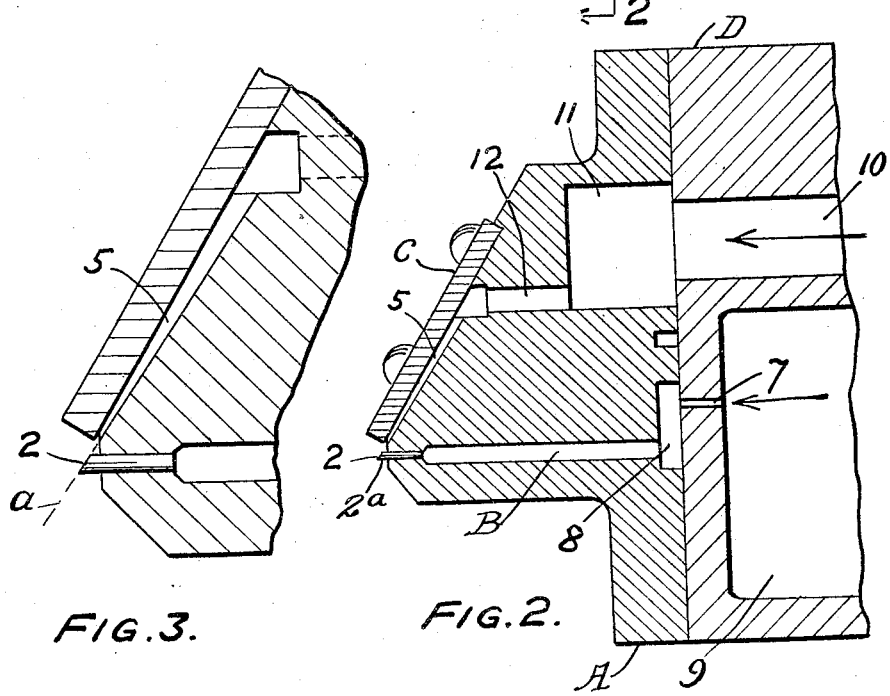
Fig. 2 is a sectional view taken on the line 2—2 of Fig. 1.
Fig. 3 is an enlarged view of some of the parts shown in Fig. 2, and it is illustrative of the operation of the device.

Referring to the drawing, 1, 2 and 3 indicate a series of openings of substantially the same size providing a group of liquid jets. The groups may be repeated across the machine and therefore the description will be confined to one group. While three liquid jets are shown in each group, the point is that there are a plurality of liquid jets in each group and the number of jets may be changed. There is a corresponding series of openings 4, 5 and 6 arranged for providing air jets for spraying the liquid jets. The discharge openings of the liquid jets are arranged outside of the air columns of the air jets to permit the latter to oppose the flow of the liquid jets and create uniform back pressure thereon. Referring to Fig. 3, the openings 5 are in the form of tapering channels and the discharge openings of the liquid jets 2 are arranged outside of the air columns of the air jets. The dash and dot line $a$ in that figure may be taken to be the outside of the air column or the prolongation of the inner wall of the channel 5, and that line $a$ is substantially the limit to which the opening 2 should extend in order to create back pressure at the openings 2. Another way to explain this is to say that the liquid jet tube should not enter the air jet because if it did it would produce a swirling action that would not exert back pressure but would exert a suction effect. 7 is a single orifice through which liquid is fed under pressure to the group of liquid jets. The orifice 7 is a throttle orifice and it may be described as minute. Air is not admitted to the liquid supply means 8, so that the liquid therein is under pressure supplied to the compartment 9, and the pressure on the liquid in the compartment 9 may be adjusted to suit the requirements of the spraying operation. There is also a back pressure on the openings 2, which though comparatively small is sufficient to effect uniform sub-division between the openings 2 of the liquid supplied through the orifice 7, and this is true even though the openings 2 are not in absolute alignment. Another way to regard the action last referred to is to say that the columns of the air jets uniformly impede the flow of the water jets but whether the retarding effect on the water jets be regarded as back pressure or impedance is not important. Air under pressure is supplied by way of the passage 10 and header 11 with branches 12.

Figure 1:
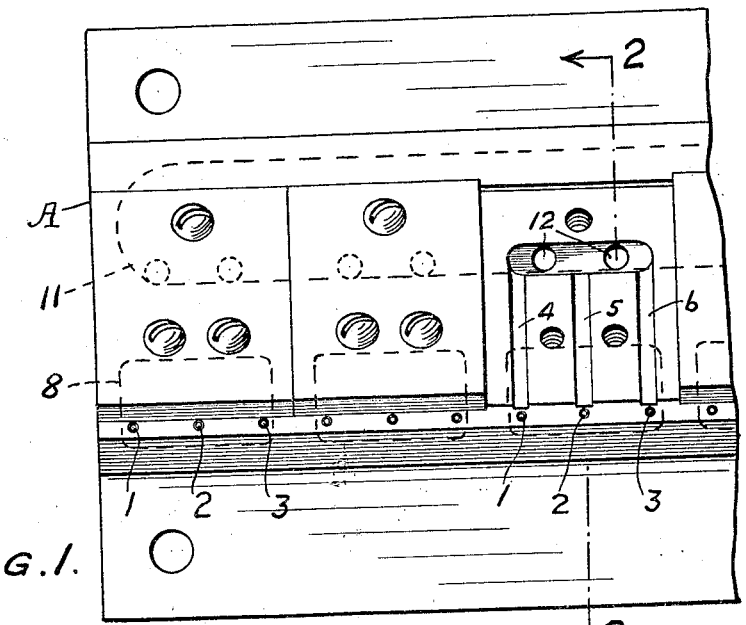

For the sake of more detail description of the drawing, A is a bar beneath which the sheets to be sprayed travel. The bar A is channeled at intervals in the form shown by dotted lines in Fig. 1 at 8. The bar A is drilled with holes B extending from each channel 8 nearly through it. Tubes 2ª extend from the holes B and project beyond the bar A. The bar A is also channeled in the form indicated at 11 in Fig. 1, and holes 12 are drilled from this channel through the bar. The front of the bar is inclined and on the inclined face are cut channels 4, 5, 6, in the form of three sides of a rectangle in cross-section. The bottom wall of these channels inclines inward and upward. Flat cover plates C are attached to the inclined face of the bar A and provide the third wall of the channels 4, 5 and 6, and house the air inlets 12 causing them to communicate with the channels. At the back of the bar A is a groove which when closed by the element D constitutes a header from which the ducts 12 extend. The element D is provided with an air supply passage 10 and with a liquid trunk 9.

The mode of operation may be described as follows:

Assuming a supply of liquid under pressure in the reservoir 9 and a supply of air jets at 4, 5 and 6, liquid at a uniform rate, depending on the pressure on the liquid in the reservoir 9, passes through the throttle orifice 7. The liquid passing the orifice 7 is evenly sub-divided between and sprayed from the jets 1, 2 and 3 because the openings of the latter are of the same size and they are all subjected to the same back pressure or resistance of the air columns of the air jets. Change of pressure on the liquid in the reservoir 9 merely increases or decreases the total quantity of liquid sprayed while the liquid remains equally sub-divided between the jets in each group. Inasmuch as a throttle orifice 7 is common to a number of liquid jets, it may be, while still very minute, larger than would be the case if each jet was supplied by a throttle orifice, and if each jet were supplied by a separate throttle orifice the latter would have to be so small as to be difficult or impossible of commercial manufacture, and variation in the size of these very small orifices would produce liquid jets of different volume.

It may be said that when an air jet crosses a liquid jet in the air and beyond the orifice from which the liquid jet issues, the air jet impedes the progress of the liquid jet and causes no sucking effect at the nozzle from which the liquid jet is discharged.

It will be obvious to those skilled in the art to which my invention relates that modifications may be made in details of construction and arrangement and matters of mere form without departing from the spirit of the invention which is not limited to such matters or otherwise than the prior art and the appended claims may require.

I claim:

1. In a spraying machine means for equally dividing and spraying a supply of liquid under pressure which comprise an element having a series of openings of substantially the same size providing a group of water jets, said element having a corresponding series of openings arranged for providing air jets in columnar form and of substantially uniform pressure for spraying the liquid jets, the discharge openings of the liquid jets being arranged outside of the air columns of the air jets to cause the latter to oppose the flow of the liquid jets and create uniform impedance thereto, and said element having a single orifice through which liquid is fed under pressure to the group of liquid jets.

2. In a spraying machine means for equally dividing and spraying a supply of liquid under pressure which comprise an element having a group of air jets of substantially uniform pressure, said element having liquid nozzles of substantially uniform size having their respective open ends disposed outside of the respective columns of the air jets and within the influence thereof to create substantially uniform back pressure at the open ends of the nozzles, and said element having means for delivering a single supply of liquid under pressure to the group of nozzles against the uniform back pressure to equally divide the liquid between the nozzles.

3. The method of spraying in which liquid is distributed to a plurality of discharge points by discharging it under pressure against a uniform back pressure set up by a blast of air.

HARRY C. COLE.